(12) United States Patent
Miklos et al.

(10) Patent No.: US 12,285,711 B1
(45) Date of Patent: Apr. 29, 2025

(54) AUTOMATIC SAMPLE COLLECTOR AND EXTRACTOR

(71) Applicant: Combat Capabilities Development Command, Chemical Biological Center, Apg, MD (US)

(72) Inventors: Aleksandr E Miklos, Baldwin, MD (US); Robert Cory Bernhards, Abingdon, MD (US); Katherine M. Broadway, Lorton, VA (US); Harold S Wylie, North East, MD (US); Phillip M Mach, Aberdeen, MD (US)

( * ) Notice: Subject to any disclaimer, the term of this patent is extended or adjusted under 35 U.S.C. 154(b) by 1050 days.

(21) Appl. No.: 17/060,386

(22) Filed: Oct. 1, 2020

Related U.S. Application Data

(60) Provisional application No. 62/909,417, filed on Oct. 2, 2019.

(51) Int. Cl.
| | |
|---|---|
| *B01D 46/54* | (2006.01) |
| *B01D 39/16* | (2006.01) |
| *B01L 3/00* | (2006.01) |
| *G01N 35/00* | (2006.01) |

(52) U.S. Cl.
CPC ....... *B01D 46/546* (2013.01); *B01D 39/1623* (2013.01); *B01L 3/5027* (2013.01); *G01N 35/00871* (2013.01); *B01D 2239/025* (2013.01); *B01D 2239/0631* (2013.01)

(58) Field of Classification Search
None
See application file for complete search history.

(56) References Cited

U.S. PATENT DOCUMENTS

| | | | | |
|---|---|---|---|---|
| 5,909,743 | A * | 6/1999 | Thies | ................... A47L 15/0049 134/115 G |
| 10,317,320 | B2 * | 6/2019 | David | ................... G01N 1/2205 |
| 2016/0348186 | A1 * | 12/2016 | Henderson | ............ A01K 1/0058 |
| 2020/0086312 | A1 * | 3/2020 | Hiddessen | .......... B01L 3/50273 |
| 2021/0102963 | A1 * | 4/2021 | Yost | ................. G01N 35/00613 |

* cited by examiner

*Primary Examiner* — Clayton E. LaBalle
*Assistant Examiner* — Diana Hancock
(74) *Attorney, Agent, or Firm* — Timothy M. Barlow; Ulysses J. Biffoni (57) ABSTRACT

Devices are provided for remote environmental and atmospheric testing that can be deployed without personnel entering a potentially dangerous area. The device can detect and automatically analyze biological and chemical agents and then automatically report if any of these agents are present without the intervention of public safety or military personnel. During sample collection and analysis, the device deploys a sample-collecting pad, tape, or filter which is then retracted with captured samples (liquid or solid) obtained from either surfaces or as aerosols from the air. The captured samples may be retracted into an enclosed vessel which will then extract the sample off of the pad, tape, or filter into a liquid carrier, and this liquid carrier is delivered to a downstream process for further analysis. The steps between sample collection and analysis are completely automated and include solvent washes, extractions, centrifugations, or other steps that are not normally readily amenable to totally-hands-off automation.

8 Claims, 10 Drawing Sheets

AUTOMATIC SAMPLE COLLECTOR AND EXTRACTOR

RELATED APPLICATIONS

This application is a non-provisional application that claims priority benefit of U.S. Provisional Ser. No. 62/909,417 filed Oct. 2, 2019; the contents of which are hereby incorporated by reference.

GOVERNMENT INTEREST

The invention described herein may be manufactured, used and licensed by or for the U.S. Government.

FIELD OF THE INVENTION

The invention relates in general to remote sample collection, and in particular to a device for automated sample collection and automated analysis and reporting of the collected sample types.

BACKGROUND OF THE INVENTION

Sample-collecting materials or sampling media, which may generally include filters, pads, or tapes, are capable of capturing samples (liquid or solid) from either surfaces or as aerosols from the air. However, these sample-collecting materials require some level of manual intervention and handling in order to remove the collected sample and to make the collected sample suitable for downstream analysis. These manual interventions generally take the form of solvent washes, extractions, centrifugations, or other steps that are not readily amenable to totally-hands-off automation.

With the increasing likelihood of chemical and biological attacks attributable to asymmetrical warfare and terrorist attacks, it has become increasing important to monitor atmospheric and environmental conditions for harmful chemical or biological agents without endangering public safety or military personnel.

Currently, a scenario that may pose a biological threat, such as an unidentified plume of material, requires personnel to enter the affected area and to deploy collection kits. These deployed collection kits must then be retrieved and manually analyzed using techniques that illustratively include lateral flow immunoassay. The existing process poses needless exposure of personnel to potentially dangerous conditions and is also time consuming and labor intensive with a delay in reporting results as the sampling devices are collected and then manually evaluated and reported.

Thus, there is a need for devices for remote environmental and atmospheric testing that can be deployed without personnel entering a potentially dangerous area, and that can detect and automatically analyze biological and chemical agents and then automatically report if any of these agents are present without the intervention of public safety or military personnel.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

An automated device is provided for remote environmental and atmospheric testing. The device includes a sampling medium in communication with an enclosure or a filter device, a processing stage that prepares and amplifies samples obtained from the sampling medium and analyzes the prepared and amplified samples, and a communication interface that wirelessly transmits analysis results.

An automated device is provided for remote environmental and atmospheric testing. The device includes an electric motor that is coupled to and drives a centrifugal impeller to retract a sample medium that collects samples or a pump to drive fluid flow, the sample medium dissolved or washed by mechanical agitation of the impeller or fluid flow to form a wash fluid containing the collected samples. The wash fluid is introduced into analysis in a housing by running the impeller at a high speed to create a pressure gradient and pumping the sample out or by more conventional pumping.

A process is provided for remote environmental and atmospheric testing using the disclosed automated device. The process includes releasing the device above an unknown plume or area to be sampled, and receiving a transmission of analysis results from the device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein:

FIGS. 1A-IC illustrate an embodiment of a sample collection device with a retractable sampling-collector tape that deploys from and retracts into an enclosure in complete perspective form (FIG. 1A), exploded view (FIG. 1B), and perspective view absent a cover (FIG. 1C);

FIGS. 6A and 6B are exploded views of a prior art electrostatic collection cartridge, where FIG. 6A is a perspective view and FIG. 6B is a right side view in accordance with embodiments of the invention;

FIGS. 10A and 10B are schematics of alternative embodiments of inventive devices with material extractor (FIG.

10A) and a material permissive filter (FIG. 10B) in place of an electrostatic material collector;

DETAILED DESCRIPTION OF EMBODIMENTS OF THE INVENTION

The following description of embodiments of the invention is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-3, 2-4, 3-4, and 1-4.

The invention has utility as devices for remote environmental and atmospheric testing that can be deployed without personnel entering a potentially dangerous area. Embodiments of the device can detect and automatically analyze biological and chemical agents and then automatically report if any of these agents are present without the intervention of public safety or military personnel. Chemical agents may illustratively include chemical warfare agents (CWA), CWA simulants, ammonia, and other toxic gases such as hydrogen sulfide, arsine, chlorine, and nitrogen dioxide, among others.

Embodiments of the inventive sample collection and analysis device deploy a sample-collecting pad, tape, or filter which is then retracted in some inventive embodiments with captured samples (liquid or solid) obtained from either surfaces or as aerosols from the air. The captured samples may be retracted into an enclosed vessel which will then extract the sample off of the pad, tape, or filter into a liquid carrier, and this liquid carrier is delivered to a downstream process for further analysis. Embodiments of the invention automate the steps between sample collection and analysis that may include solvent washes, extractions, centrifugations, or other steps that are not normally readily amenable to totally-hands-off automation.

Figures 1A, 1B, 1C:
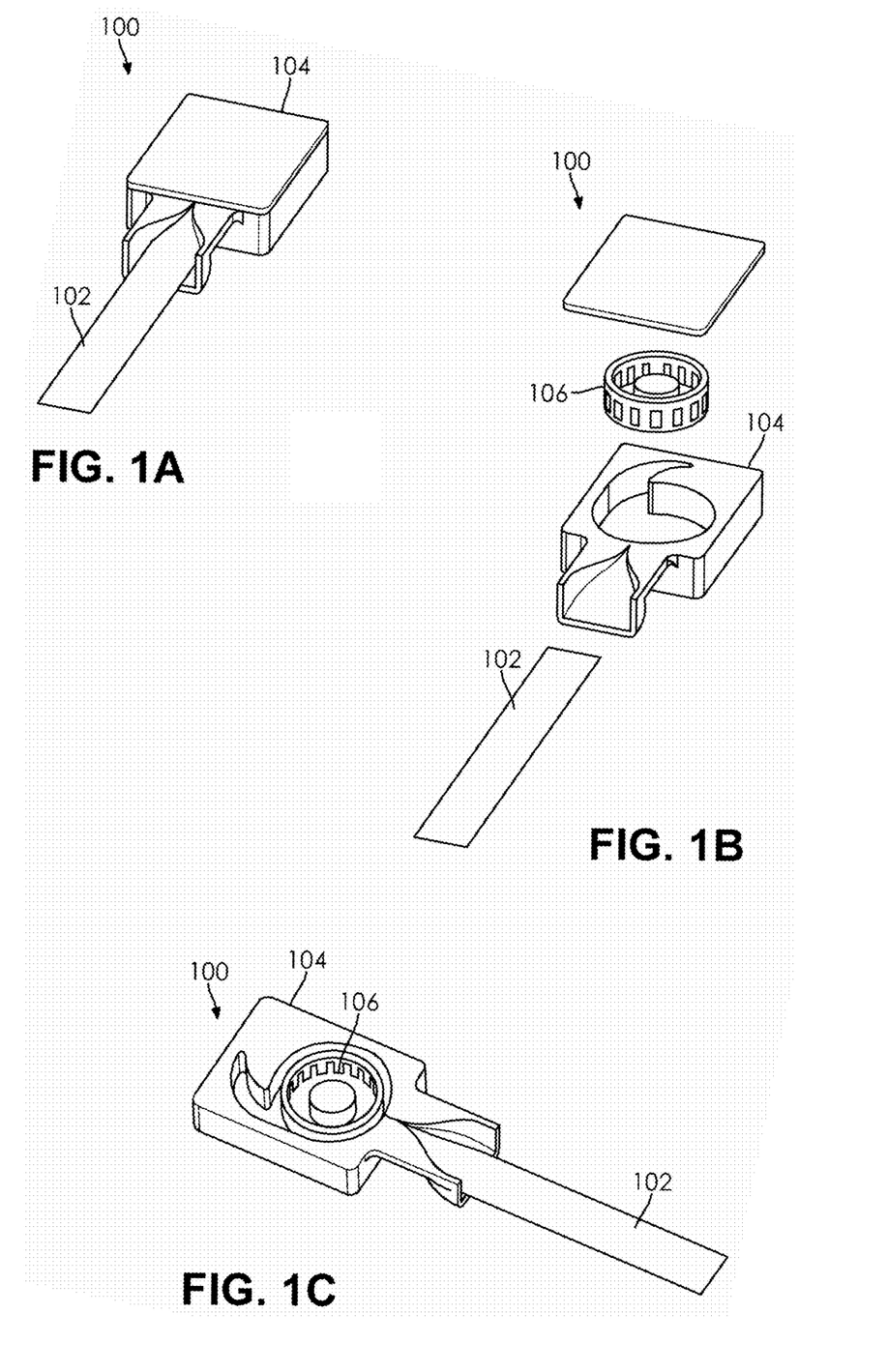

Referring now to the figures, FIGS. 1A-1C illustrate an embodiment of a sample collection device 100 with a retractable sampling medium comprising sampling-collector tape 102 that deploys from and retracts into an enclosure 104. A circular mechanism 106, which may use the energy stored in a wound spring inside the enclosure 104 to "wind up" the sample-collector tape 102, effectively retracting it inside of the enclosure 104 of the device 100. In a specific inventive embodiment, the sampling-collector tape 102 may be a water-soluble adhesive tape.

Figures 2, 3:
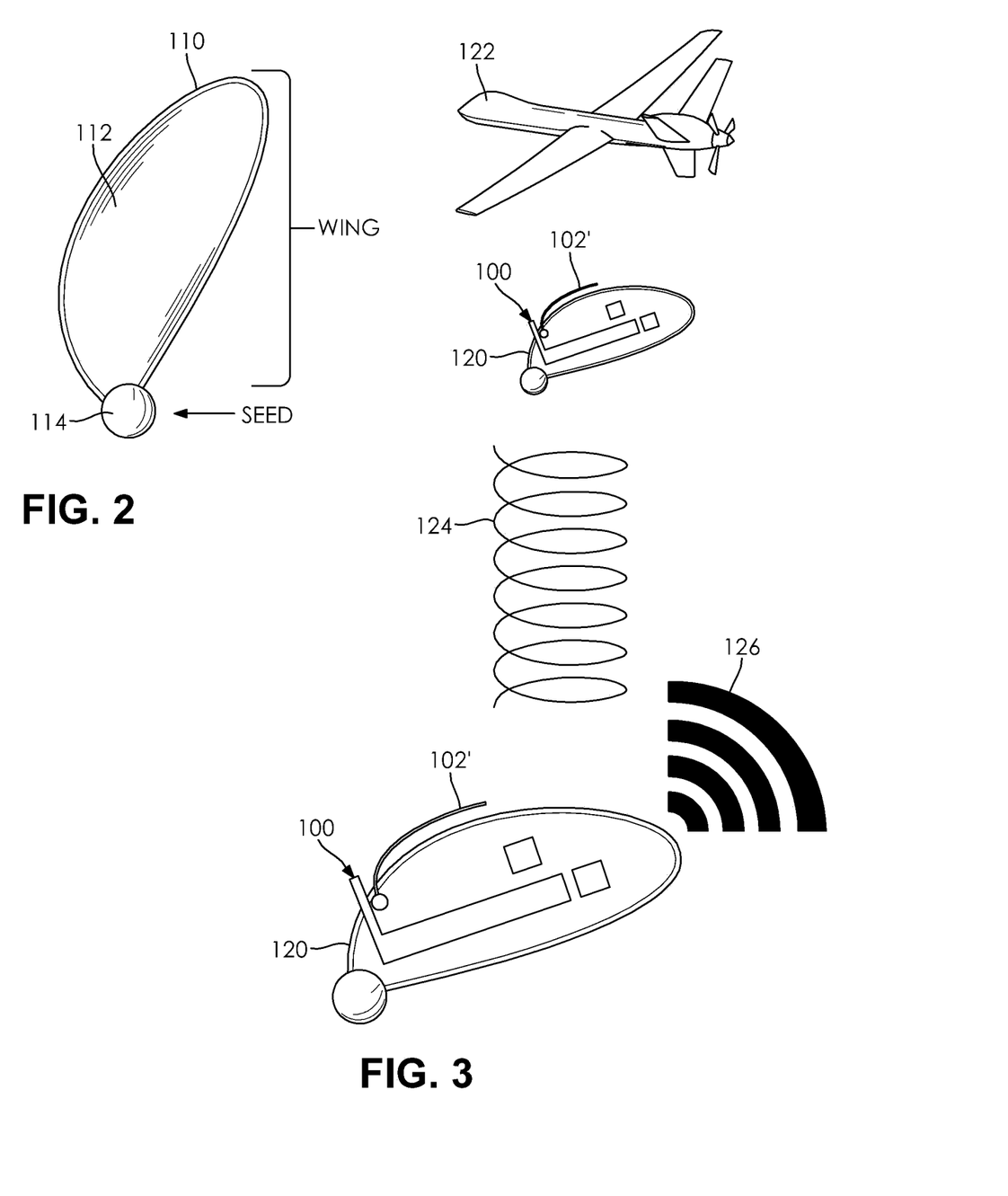
FIG. 2 illustrates a deployment vehicle modeled after a maple seed with an aerodynamic portion formed as a wing and a weighted portion formed as a seed in accordance with embodiments of the invention.
FIG. 3 illustrates a deployment of a sample collection device from a drone to sample an unknown plume in accordance with embodiments of the invention.

FIG. 2 illustrates a deployment carrier 110 modeled after a maple seed 110' with an aerodynamic portion 112 and a weighted portion 114. When dropped from a height above the ground, the deployment carrier 110 mimics the spiraling action of the maple seed as the deployment carrier 110 drops toward the ground. In embodiments of the invention, the deployment carrier 110 is outfitted with sampling and analysis equipment to form a unified biological collector and detector device 120 (hereinafter referred to as device 120) as shown in greater detail in FIG. 4.

As shown in FIG. 3, the device 120 may be deployed from a flying vehicle 122, such a remote controlled drone or aircraft, and as symbolized by the spiral 124, the deployed device 120 rotates through the atmosphere as the device falls to the ground. During the rotation a sampling medium 102' is deployed to collect samples that are incident with the sampling medium 102'. The deployed sampling medium 102' may be retracted before the descent of the device 120 is completed using a built in altitude sensor at a selected height, or when the descent is stopped when the device lands on the ground or a building rooftop. Once the sampling medium 102' is retracted, the sampling medium 102' is automatically prepared and automatically analyzed for contaminants. In specific inventive embodiments, the rotation of the device 120 as it descends produces a centrifugal motion that enables sample collection and microfluidic-based assay. The results of the analysis are then broadcast via wireless links 126. The completely unmanned and automated operation of embodiments of the device 120 provide for rapid identification of biohazard agents and other toxins, with accelerated warning times that increase confidence in decision making post-incident.

Figure 4:
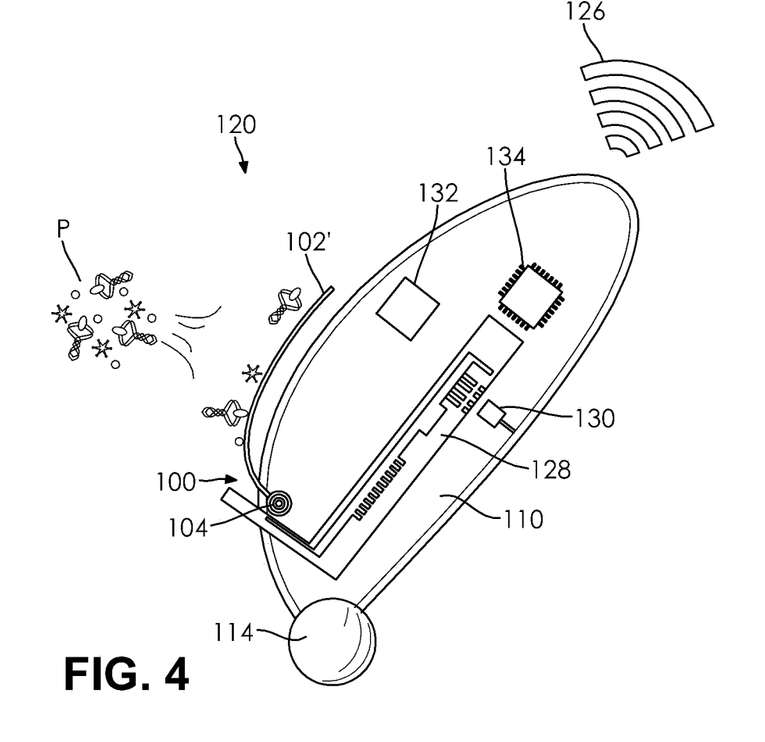
FIG. 4 is a detailed view of the sample collection device of FIG. 3 with the major components shown with respect to an unidentified plume from which samples are to be gathered from in accordance with embodiments of the invention.

FIG. 4 is a detailed view of the device 120 with the major components shown with respect to an unidentified plume containing material to be sampled P. The sampling medium 102' is shown deployed from the enclosure 104 with material P from the plume collecting on the surface of the sampling medium 102'. The sampling medium 102' is subsequently retracted into the enclosure 104 and the sampling medium 102' is dissolved. The processing stage 128 prepares and amplifies the obtained sample. In a specific embodiment the sample is analyzed using an optical or fluorescent signal using the light source 130 and optical detector 132. A microprocessor 134 with onboard memory runs the firmware or software that controls the operation of the device 120. A communications interface may be integrated with the microprocessor 134 or may be a separate integrated circuit for transmission 126 of the sampling results of the analysis. A power source 114 provides power to the components of the device 120.

In a specific inventive embodiment for biological threats, sample collection occurs in under two minutes, with DNA preparation also taking place in under two minutes following the sample collection. The analysis may then be conducted in ten to fifteen minutes using loop-mediated isothermal amplification (LAMP) assay.

LAMP is an isothermal nucleic acid amplification technique, and since isothermal amplification is carried out at a constant temperature, the amplification technique does not require a thermal cycler. In LAMP, the target sequence is amplified at a constant temperature of 60-65° C. using either two or three sets of primers and a polymerase with high strand displacement activity in addition to a replication activity. Typically, four different primers are used to amplify six distinct regions on the target gene, which increases specificity. An additional pair of "loop primers" can further accelerate the reaction. The amplification product can be detected via photometry, measuring the turbidity caused by magnesium pyrophosphate precipitate in solution as a byproduct of amplification, which allows easy visualization by the naked eye or via simple photo metric detection approaches for small volumes. The reaction can be followed in real-time either by measuring the turbidity or by fluorescence using intercalating dyes such as SYTO 9. Dyes such as SYBR green, can be used to create a visible color change that can be seen with the naked eye without the need for expensive equipment, or a response that can more accurately be measured by instrumentation. Dye molecules intercalate or directly label the DNA, and in turn can be correlated with the number of copies initially present. Hence, LAMP can also be quantitative. In-tube detection of DNA amplification is possible using manganese loaded calcein which starts fluorescing upon complexation of manganese by pyrophosphate during in vitro DNA synthesis. The technique is LAMP is well known to the art. K. Dhama, et al., "Loop-mediated Isothermal Amplification of DNA (LAMP): A New Diagnostic Tool Lights the World of Diagnosis of Animal and Human Pathogens: A Review." Pak. J. Biol. Sci., 17(2) 151-166 (2014).

Figure 5:
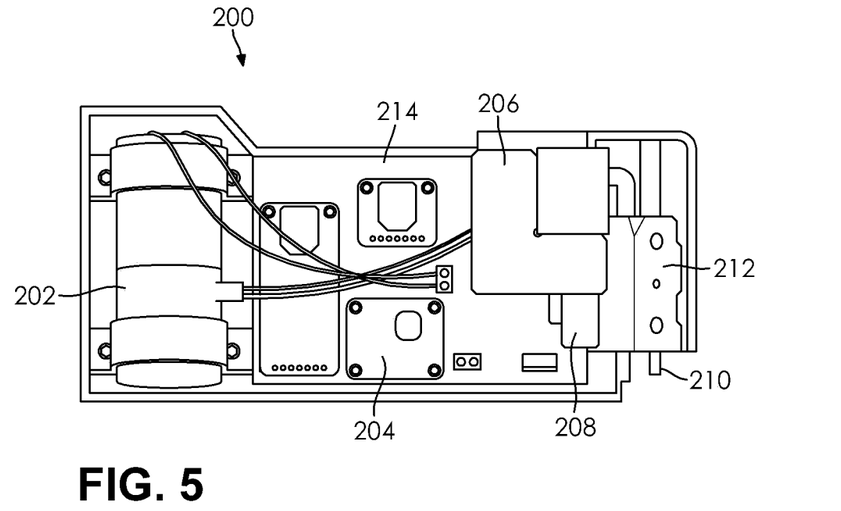
FIG. 5 is an image of aa collector stage for use with the sample collection device in accordance with embodiments of the invention.

FIG. 5 depicts an electrostatic precipitation collector stage 200 for use with the device 120 of FIG. 4 as a substitute for the sampling medium 102'. The electrostatic precipitation collector stage 200 has a pump 202 for circulating air during the particle collection process. In a specific embodiment the pump 202 has an air handling capacity of three litters per minute (3 L/min). A set of electronics on printed circuit boards 204 provide control to the pump 202 and a particle counter 206. A high voltage converter 208 provides a charge to the high voltage electrode of the electrostatic collection cartridge 210 that is inserted in the holder 212. The electrostatic collection cartridge 210 collects aerosol-based samples. The electric components (204, 206, and 208) of the electrostatic precipitation collector stage 200 are mounted to a distribution board 214.

Figure 6A:
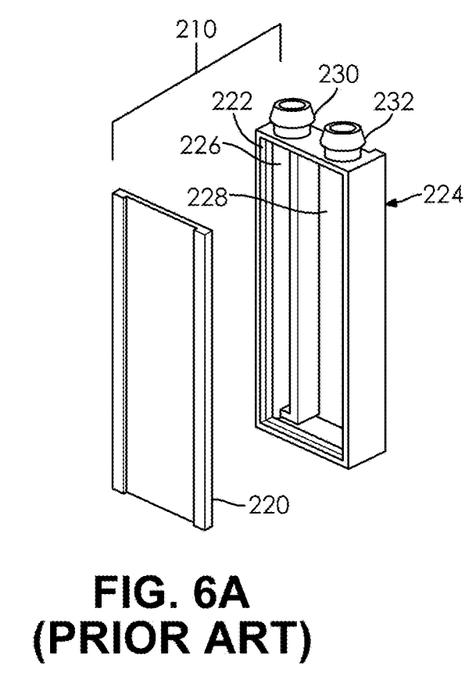
Figure 6B:
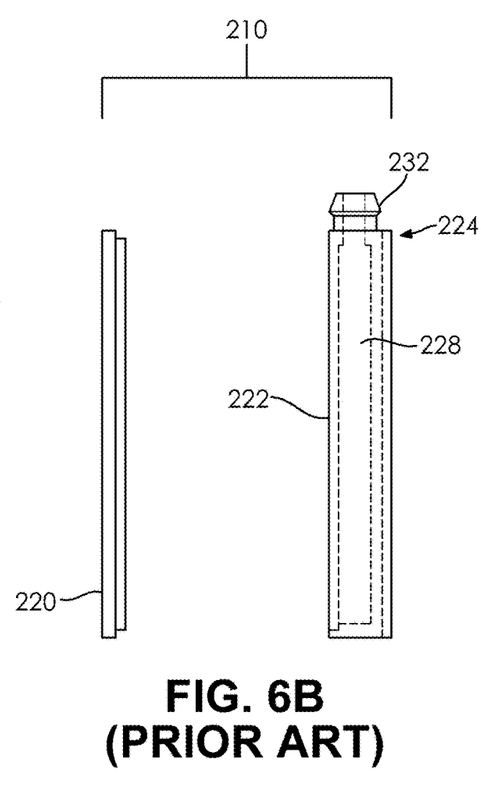

FIGS. 6A and 6B are exploded views of a prior art electrostatic collection cartridge 210, where FIG. 6A is a perspective view and FIG. 6B is a right side view. The cartridge 210 includes a lid 220 that forms a fluid tight seal against a face 222 of a body 224. The body defining a first chamber 226 and a second chamber 228, each with a connector 230 and 232 in fluid communication with chambers 226 and 228, respectively. The details of which are found in Gaurav Mahamuni, Byron Ockerrman & Igor Novosselov (2019) Electrostatic capillary collector for in-situ spectroscopic analysis of aerosols, Aerosol Science and Technology, 53:6, 688-700.

Figure 7:
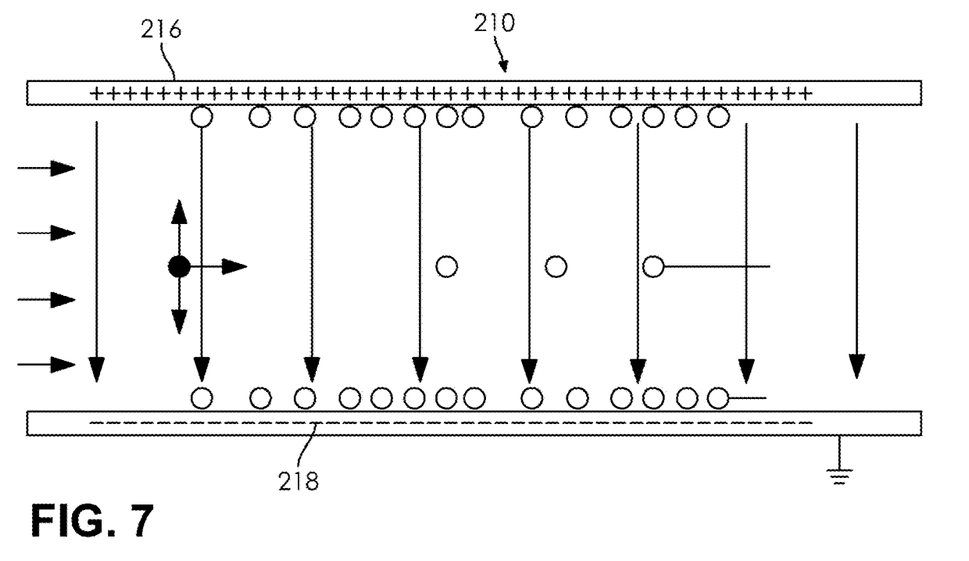
FIG. 7 is a schematic that illustrates the movement of air through a collection cartridge in accordance with embodiments of the invention.

FIG. 7 is a schematic that illustrates the movement of air through the electrostatic collection cartridge 210 where negatively charged particles in the airflow are attracted to the high voltage electrode 216 and positive charged particles in the airflow are attracted to the grounded plate 218. Uncharged particles flow through the electrostatic collection cartridge 210.

Figure 8:
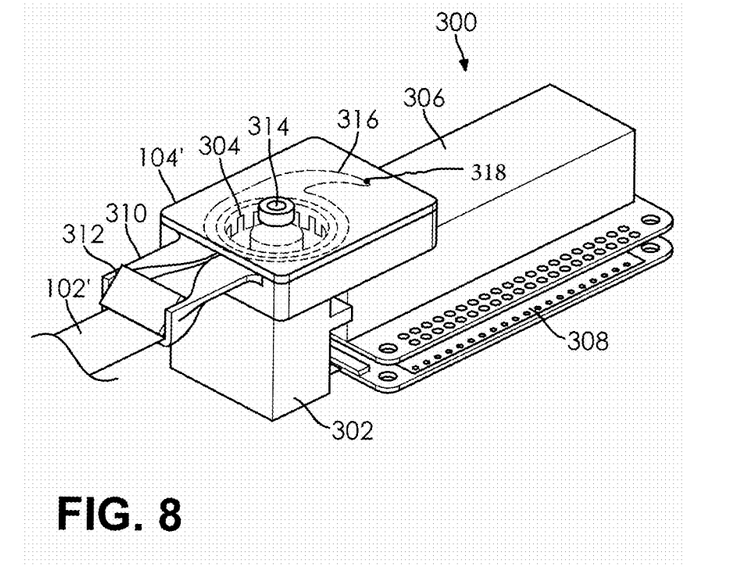
FIG. 8 is a perspective view of a sample collection device that may be mounted to a deployment vehicle in accordance with embodiments of the invention.

FIG. 8 illustrates an inventive embodiment of a sample collection device 300 that may be mounted to the deployment carrier 110 in place of collection device 100 in an inventive embodiment of the device 120. The sample collection device 300 is a multi-stage design that uses an electric motor 302 that is coupled to and drives a miniaturized centrifugal impeller 304 to retract by "winding up" a sample medium 102' and dissolve or wash the sample medium 102' by mechanical agitation (low speed "back and forth" drive of the impeller 304, and finally deliver the wash fluid (now containing the sample) to a downstream process (analysis) by running the impeller 304 at a high speed to create a pressure gradient and pumping the sample out. The housing 306 and associated circuit boards 308 are involved in the downstream process that may be the electrooptical detection system or LAMP, which is analyzing the sample collected and delivered from the impeller 304. In the embodiment of FIG. 8 a dissolvable tape sample collector is shown as the sampling medium 102' going into the enclosure 104', however it is appreciated that conventional pad or filter type collectors may be adapted for use in embodiments of the inventive automated sample collector. In specific inventive embodiments, a flap valve 312 over the retraction inlet 310 is provided so that once the device 300 fully retracts the sampling medium 102', the inlet 310 will be sealed. In specific inventive embodiments, a vent hole 314 at the center of the impeller is present so that, at high speed, ambient air is drawn in through the vent hole 314 to create the pressure needed to drive the sample out of the device (through a hole 318 at the end of the 'tear drop' 316). It is appreciated that in specific inventive embodiments, there may also be additional holes introduced to the device 300 to deliver fluid. Furthermore, there may be resistive heating elements incorporated in the case design to prevent freezing and low temperatures and to facilitate more efficient transfer of the sample into the carrier fluid.

Figure 9:
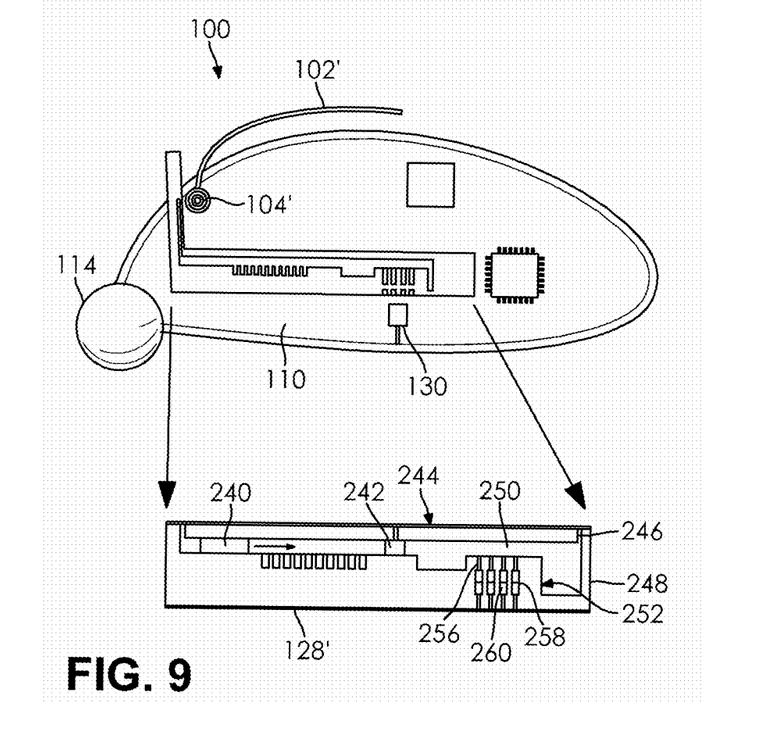
FIG. 9 is a detailed view of a processing stage in the form of a microfluidic cassette that prepares and amplifies an obtained sample using loop-mediated isothermal amplification (LAMP) assay in accordance with embodiments of the invention.

FIG. 9 is a magnified cross-sectional view of the processing stage 128 of FIG. 4 in the form of a microfluidic cassette 128' that prepares and amplifies an obtained sample using loop-mediated isothermal amplification (LAMP) assay. The unknown biological material entering the enclosure 104' is exposed to lytic conditions such as proteolytic enzymes, restriction enzymes, ribozymes, or a combination thereof for a time sufficient to cleave a biological unknown to form a lysate 240. Reagent and methods for lysis of an unknown, and transfer to lysate to a preparation solution suitable for amplification are known in the art. Shehadul Islam, M.; Aryasomayajula, A.; Selvaganapathy, P. R. A Review on Macroscale and Microscale Cell Lysis Methods. *Micromachines* 2017, 8, 83.

The lysate 240 is passed through a wash buffer 242 and enters a LAMP reaction portion 244. The LAMP reaction portion 244 is formed from a lid 246 that fits to a body 248 to define a fluidics channel 250 with at least four LAMP reaction chambers 252. The reaction chambers 252 having testable sample 256 of the unknown positioned above a wax layer 258, below which are LAMP reagents 260.

Figure 10A:
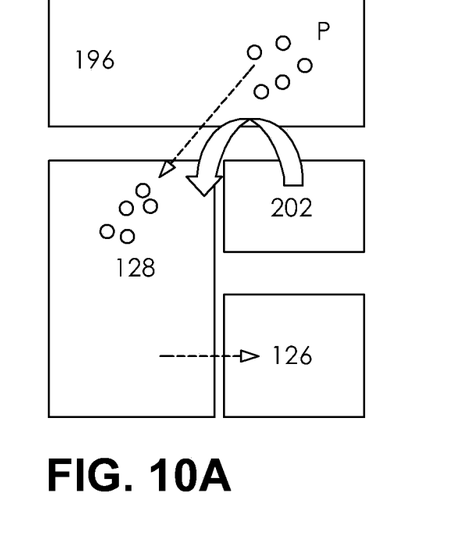
Figure 10B:
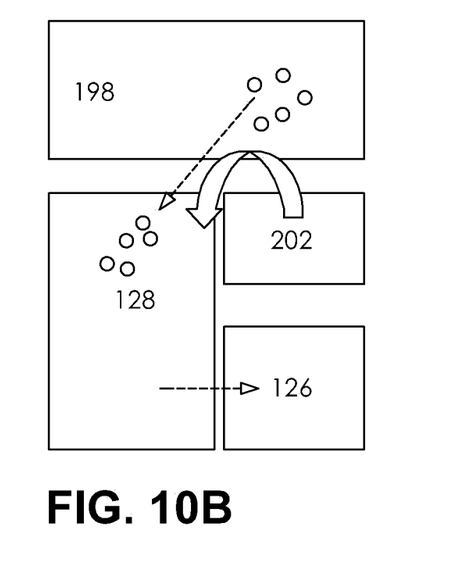

It is appreciated that a collector stage besides being the electrostatic collector detailed in the previous figures, according to the present invention is also a collector to which material to be sampled adheres by a mechanism other than electrostatics, a filter collector in which material to be sampled is transmitted therethrough, mechanical agitator or pump that pulls a volume of air into an inventive device. These are shown schematically in FIGS. 10A and 10B in which like reference numerals have the meaning ascribed thereto with respect to previously detailed figures and the dashed arrows denote transmission of material or data. In FIG. 10A, an extractor 196 optional functioning with a retracting tape is provided to actively absorb a material to be sampled. Extractor substances a readily dispersed in a polymer and spin coated to form an extractor 196. Substances active as an extractor 196 illustratively include activated charcoal, metal-organic frameworks (MOFs), porphyrins, and combinations thereof. The material to be sampled, P in an air plume is urged through the extractor 196 by a pump 202 and into processing stage 128 with the results of which being broadcast via wireless links 126. In FIG. 10B, a filter 198 is a porous layer for removing solid particles from the material P to be sampled. The material to be sampled, P in an air plume is urged through the filter 198 by a pump 202 and into processing stage 128 with the results of which being broadcast via wireless links 126. In FIG. 10B, a filter 197 is a porous layer for removing solid particles from the material P to be sampled. The material to be sampled, P in an air plume is urged through the filter 198 by a pump 202 and into processing stage 128 with the results of which being broadcast via wireless links 126.

Figure 11:
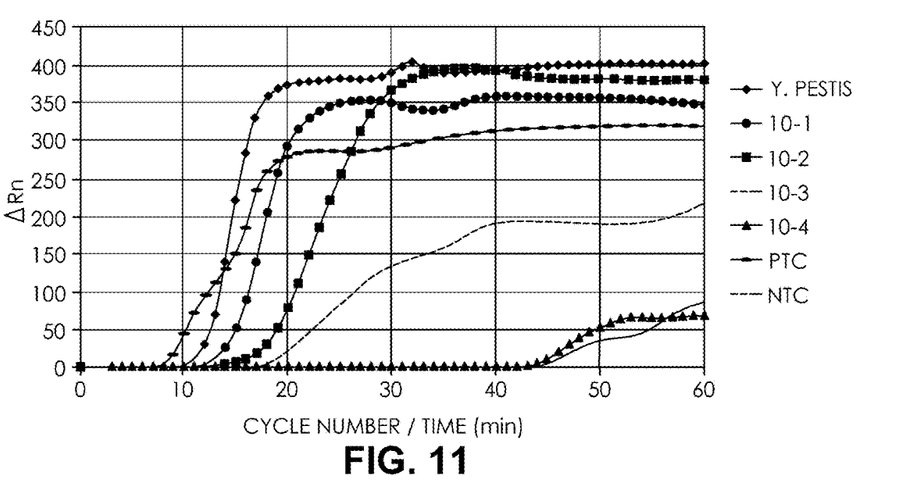
FIG. 11 is a graph that shows the limits of LAMP assay detection in accordance with embodiments of the invention.

FIG. 11 is a graph that shows the limits of LAMP assay detection.

Figure 12A:
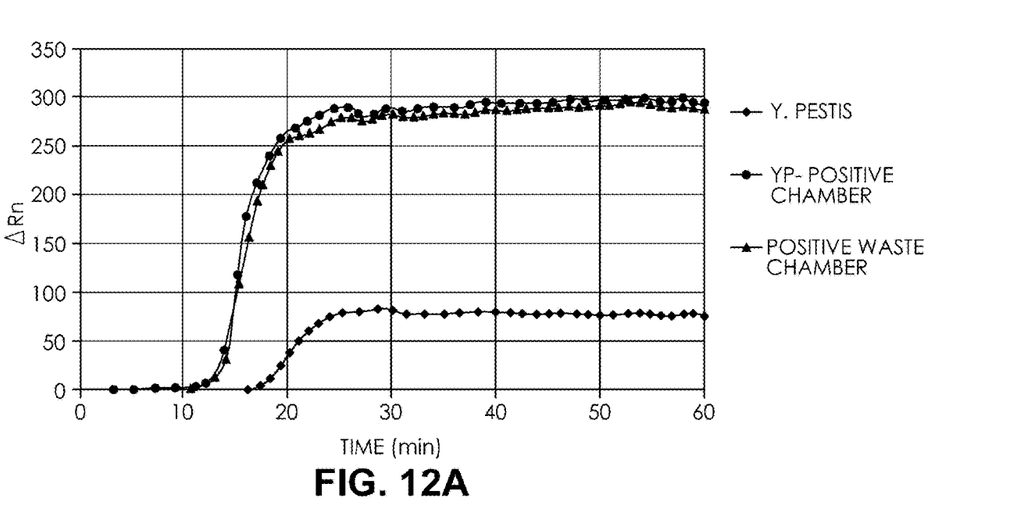
FIGS. 12A-12C are a series of graphs showing test results for the limits of LAMP detection assays in accordance with embodiments of the invention.
Figure 12B:
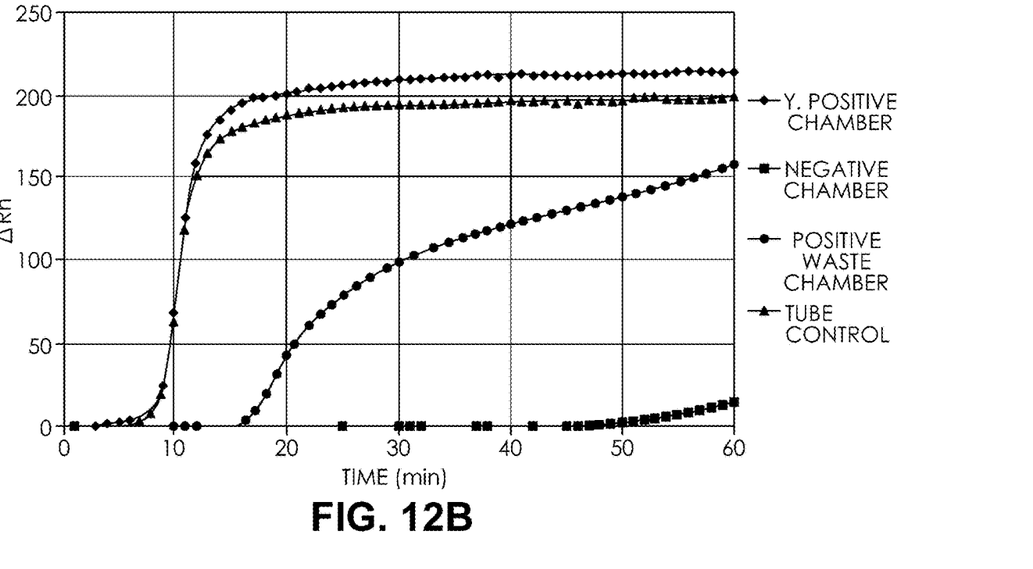
Figure 12C:
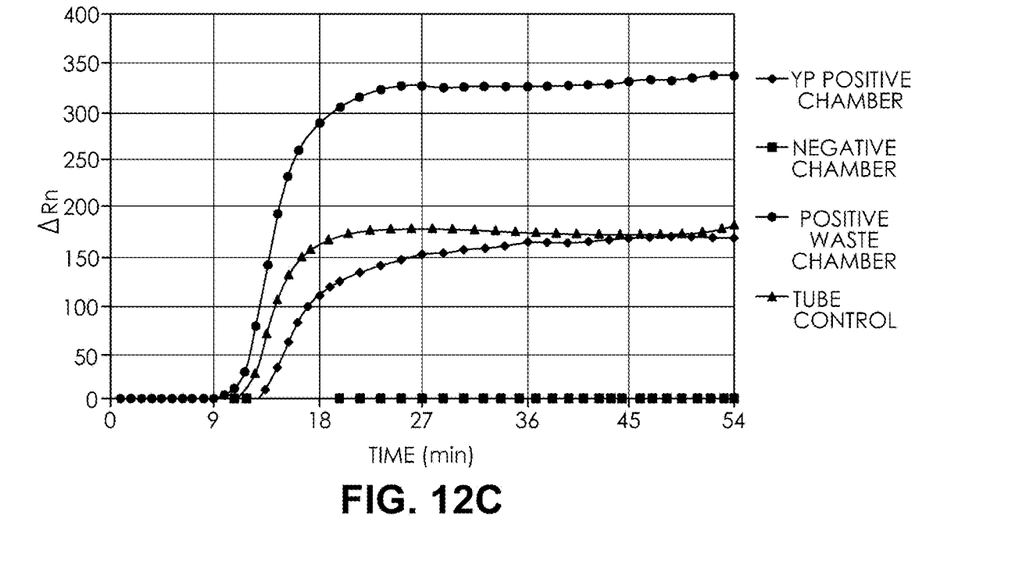
Figure 13A:
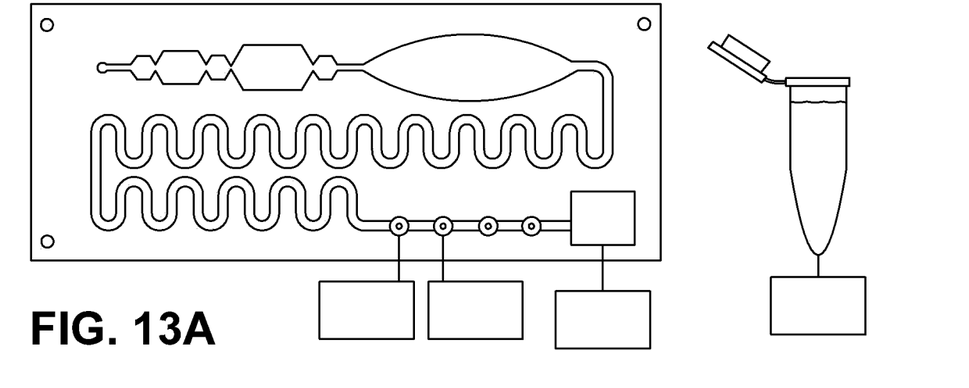
FIGS. 13A-13B are schematics showing test results for the effectiveness of preparation of *Yersinia pestis* (YP) using various portions of the microfluidic cassette in accordance with embodiments of the invention.
Figure 13B:
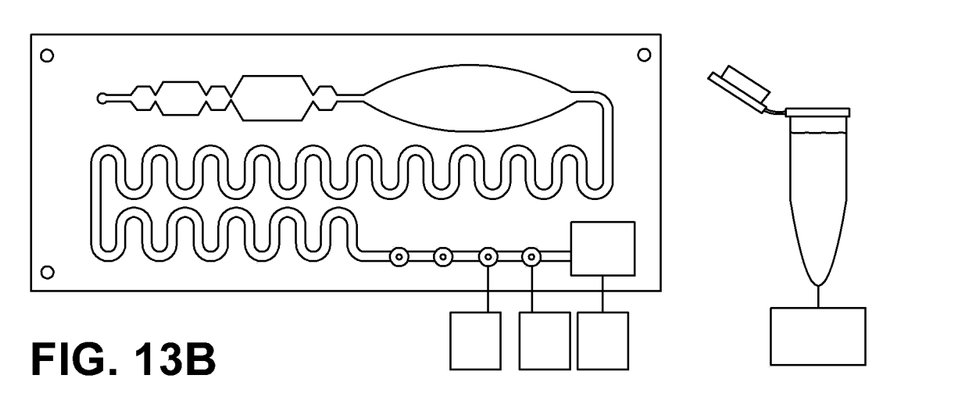

FIGS. 12A-12C are a series of graphs showing test results for the limits of LAMP detection assays. FIG. 12A is a graph of a demonstration (test #1) of automated sample preparation of *Yersinia pestis* in the microfluidic cassette 128' as shown in FIG. 13A. FIG. 12B is a graph of the results of a repeat of test #-1 with automated sample preparation of *Yersinia pestis*, extracting full volume from the positive reaction chamber to ensure all reagents within the chamber are utilized. FIG. 12C is a graph of the results of a demonstration (Test #3) of automated sample preparation of *Yersinia pestis* to determine whether utilizing a different reaction chamber (FIG. 13B) within the microfluidic cassette would yield better results. An improvement in delta Rn is observed for the positive waste chamber.

Figure 14:
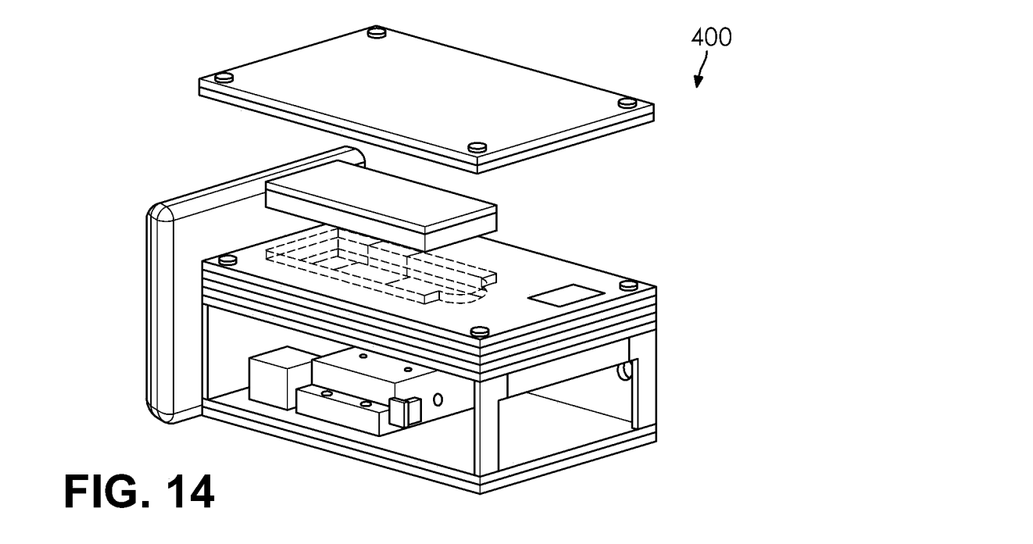
FIG. 14 illustrates a sampling device embodiment that integrates sensor components within a housing.
Figure 15:
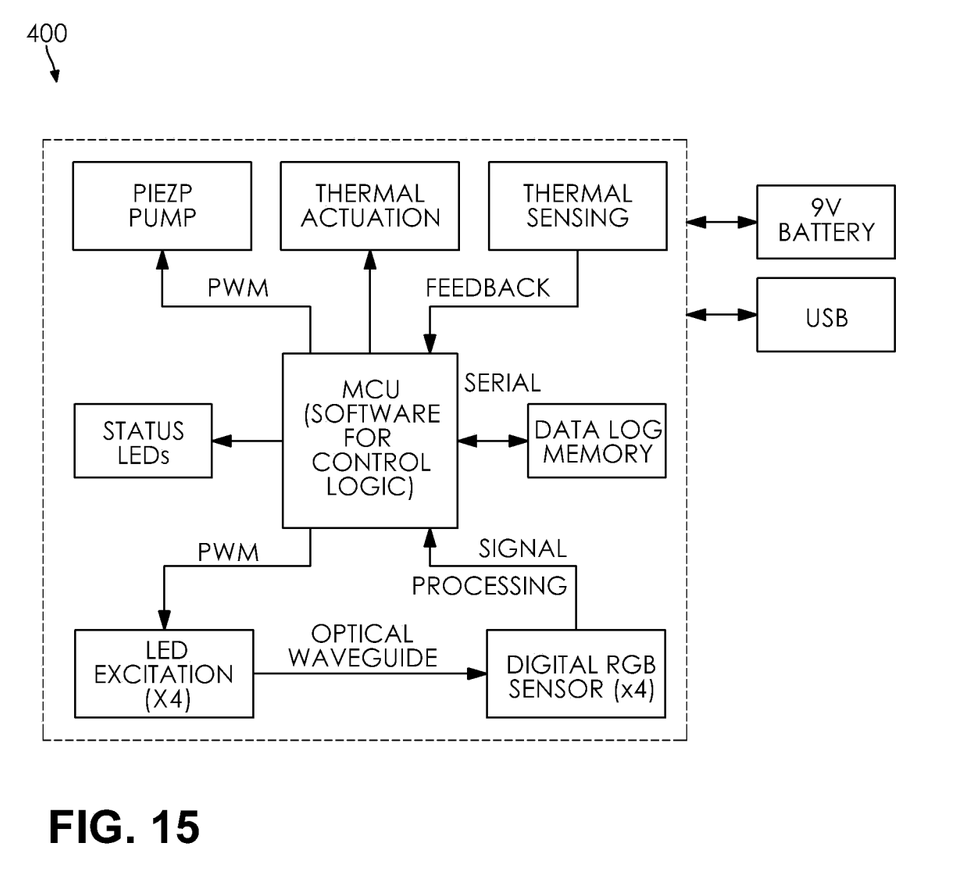
FIG. 15 is a schematic diagram of the components within the housing of FIG. 14.

FIG. 14 illustrates an inventive embodiment 400 that integrates sensor components within a housing. FIG. 15 is a schematic diagram of the components within the housing of FIG. 14. The platform shown in FIGS. 14 and 15 include optical, thermal, and pumping systems for streamlined DNA sample processing.

It is appreciated that while embodiments of the sampling device disclosed is designed to collect biological aerosols/particulates and deliver them to a nucleic-acid based assay, it is to be understood that embodiments of the designs disclosed herein can be extended to use sorbents and solvents for chemical analysis. Furthermore, embodiments of the device are also well suited to collect solid samples from surfaces.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular embodiments of the invention, but is not meant to be a limitation upon the practice thereof. The following claims, including all equivalents thereof, are intended to define the scope of the invention.

The invention claimed is:

1. An automated device for remote environmental and atmospheric testing, said device comprising:
a housing including an electric motor and a centrifugal impeller, the electric motor coupled to and adapted to drive the centrifugal impeller selectively in a first direction and a second direction, the first direction to deploy a sample medium and the second direction to retract a sample medium, and both the first direction and the second direction alternately to agitate the sample medium and collect a sample;
an inlet extending from a side of the housing and in communication with the centrifugal impeller, the inlet narrowing from a distal end away from the housing toward a proximal end attached to the housing, the distal end having a flap valve arranged to seal the distal end of the inlet, the inlet narrowing so as to present the sample medium onto the centrifugal impeller for retraction,
wherein the centrifugal impeller is arranged to retract the sample medium that collects samples by running the impeller at a high speed to create a pressure gradient and pumping the sample out of the device.

2. The device of claim 1, wherein said housing further comprises:
an electro-optical detection system or LAMP assay, which is adapted to analyze the sample collected and delivered from the impeller.

3. The device of claim 2, wherein the electro-optical detection system further comprises an optical processor, an optical or fluorescent signal generated by a light source, and a microprocessor with onboard memory that runs firmware or software adapted to control the operation of the device.

4. The device of claim 1, wherein said sampling medium is at least one of a collecting pad, a tape, or a filter.

5. The device of claim 1, wherein said sampling medium is formed of electrospun polyvinyl alcohol (PVA) nanofiber.

6. The device of claim 1, further comprising a vent hole at a center of the impeller to draw in ambient air to create pressure to drive out the wash fluid from the impeller.

7. The device of claim 6, further comprising a vent hole at a center of the impeller, the vent hole being arranged to admit ambient air during operation of the centrifugal impeller to create the pressure necessary to drive the sample out of the device.

8. The device of claim 7, further comprising a tear drop channel opposite the inlet and extending away from the inlet, the tear drop channel comprising an exit hole for removing the sample from the device.

* * * * *